Patented Mar. 10, 1942

2,275,951

UNITED STATES PATENT OFFICE 2,275,951

TREATMENT OF RUBBER

Ernest Harold Farmer, Radlett, England, assignor to The British Rubber Producers' Research Association, London, England, a body corporate of Great Britain No Drawing. Original application October 12, 1938, Serial No. 234,720. Divided and this application September 7, 1939, Serial No. 293,853. In Great Britain September 22, 1937

6 Claims. (Cl. 260—768)

This invention relates to the treatment of rubber with more especial reference to the preparation of modified rubber derivatives or resins containing additional organic substances, being subject-matter divided from co-pending application Serial No. 234,720, filed October 12, 1938.

Much of the difficulty in obtaining chemically-modified rubbers arises from the lack of reactivity of the rubber molecules towards desirable substances such as polyhydric alcohols, amino compounds, hydroxylic substances or vinyl compounds. But although rubber may not react directly with such desirable substances, the effect desired may be attained either by combining the rubber first with reagents or substances which owing to their nature will procure or facilitate combination of the product with the desirable substances in subsequent reactions, or by carrying out the reactions between rubber and the desirable substances in subsequent reactions, or by carrying out the reactions between rubber and the desirable substances in the presence of suitably reactive substances which are capable not only of combining with rubber but in so combining afford a means of linking the rubber molecules to those of the desirable substances.

In the aforementioned co-pending application Serial No. 234,720, reactive derivatives are obtained by combining maleic anhydride with rubber conveniently by bringing together the rubber dissolved in a suitable solvent such as toluene, xylene, decalin, cyclohexane or benzene, preferably in dilute solution, with the maleic anhydride and a suitable catalyst or condensing agent such as benzoyl peroxide and maintaining the mixture for a period at a suitable temperature.

The rubber-maleic anhydride products undergo change when heated with reagents which might be expected to attack the anhydride groupings incorporated in these substances. For example they react with aniline, caustic alkalies and alcohols when heated with these reagents in a suitable medium. Furthermore the maleic anhydride affords a link whereby the rubber-maleic anhydride products may be combined with other substances, for example, polyhydric alcohols such as glycols, amines or amino compounds such as tetramethylene-diamine and hydroxylic substances such as cellulose acetate, the products being extracted by precipitation, removal of the solvent, or in other appropriate manner and being in general thermo-plastic, resinous, substances.

In the case of vinyl compounds, however, it has been found according to the present invention that the two-stage reaction is unsatisfactory but that by simultaneously reacting by heating together rubber, maleic anhydride and one or other of the members of the group of vinyl compounds as exemplified by styrene, vinyl acetate and α-methylacrylic ester in a suitable solvent and in the presence of a small proportion of benzoyl peroxide to act as condensing agent, there is formed in each case a resinous product which appears to be a homogeneous material formed by union of rubber, maleic anhydride and the vinyl compound, and which differs in characteristics and yield from the products obtained by heating together in a suitable medium and in presence of a small proportion of benzoyl peroxide (a) rubber and maleic anhydride, and (b) maleic anhydride and the vinyl compound.

The following examples will serve to illustrate the invention.

Example 1

A solution of rubber (10 grams) in toluene (365 grams) is mixed with styrene (17 grams), maleic anhydride (10 grams) and benzoyl peroxide (0.1 gram, dissolved in a little toluene). The mixture is heated for 17 hours at 85° C. during which time no precipitate is thrown down. The resulting solution is poured with stirring into alcohol, and the precipitate so obtained washed with alcohol and finally dried in vacuo. The product is an apparently homogeneous resin apparently composed of rubber, maleic anhydride and styrene, weighing 16 grams.

The yield of the final product improves considerably when an increased proportion of benzoyl peroxide is used. Thus when the experiment is repeated using in turn 0.3 gram, 0.5 gram, 1.0 gram of benzoyl peroxide, the yields of resin are respectively 26.2 grams, 28.6 grams and 28.3 grams.

When the proportions of the reactants are somewhat varied, using rubber (10 grams), maleic anhydride (10 grams), styrene (10 grams) and benzoyl peroxide (0.7 gram), all in toluene (410 grams), a resinous product weighing 30 grams is finally obtained.

All the foregoing products resembled in superficial appearance the rubber-maleic anhydride products described in the aforementioned application, but differed materially in their nature from, and were obtained in superior yield to, the resins which may be obtained by heating together maleic anhydride and styrene in a suitable solvent (e. g., toluene, carbon tetrachloride or xylene) with a little benzoyl peroxide as condensing agent.

Example 2

A solution of rubber (10 grams) in xylene (410 grams) is mixed with maleic anhydride (10 grams), vinyl acetate (10 grams) and benzoyl peroxide (0.7 gram, dissolved in a little xylene). The mixture is heated for 18 hours at 70° C. during which time no amorphous precipitate is thrown down (as occurs when rubber is omitted from the ingredients), although some tendency to gelling is manifest. The reaction liquor when poured with stirring into alcohol gives a precipitate, which after being washed with alcohol and dried in vacuo constitutes a homogeneous resin. Yield 15.2 grams.

As mentioned in co-pending application Serial No. 234,720 previously referred to, increase in the proportion of maleic anhydride employed in relation to the rubber enhances the degree of reactivity of the individual rubber molecules, the limit of such reactivity being apparently reached when each $C_5H_8$ unit of the rubber combines with one molecule of maleic anhydride $C_4H_2O_3$.

What I claim is:

1. A process for the preparation of modified rubber derivatives or resins consisting in reacting maleic anhydride with rubber and a compound selected from the group consisting of styrene, vinyl acetate and $\alpha$-methacrylic ester in solution in the presence of a catalyst or condensing agent and maintaining the mixture at a temperature of 70 to 100° C. for a period of several hours.

2. A process for the preparation of modified rubber derivatives or resins according to claim 1, wherein the reaction is carried out in the presence of a peroxide catalyst or condensing agent.

3. A process for the preparation of modified rubber derivatives or resins according to claim 1, wherein the reaction is effected with the rubber, maleic anhydride and compound selected from the group consisting of styrene, vinyl acetate and $\alpha$-methacrylic ester in solution in toluene or xylene.

4. A process for the preparation of modified rubber derivatives or resins according to claim 1, wherein the reaction product is extracted with alcohol.

5. A process for the preparation of modified rubber derivatives or resins, consisting in mixing a solution of rubber in toluene with styrene, maleic anhydride and a small proportion of benzoyl peroxide, maintaining the mixture at a temperature of about 85° C. and precipitating the reaction product with alcohol.

6. A process for the preparation of modified rubber derivatives or resins, consisting in mixing a solution of rubber in xylene with maleic anhydride, vinyl acetate and benzoyl peroxide, maintaining the mixture at a temperature of about 70° C. and precipitating the reaction product with alcohol.

ERNEST HAROLD FARMER.